(12) United States Patent
Feng

(10) Patent No.: US 11,438,403 B2
(45) Date of Patent: Sep. 6, 2022

(54) PAGE PRESENTATION METHOD AND SYSTEM, COMPUTER SYSTEM, AND COMPUTER READABLE MEDIUM

(71) Applicants: Beijing JingDong ShangKe Information Technology Co., Ltd., Beijing (CN); Beijing Jingdong Century Trading Co., Ltd., Beijing (CN)

(72) Inventor: Weiping Feng, Beijing (CN)

(73) Assignees: Beijing JingDong ShangKe Information Technology Co., Ltd., Beijing (CN); Beijing Jingdong Century Trading Co., Ltd., Beijing (CN)

(*) Notice: Subject to any disclaimer, the term of this patent is extended or adjusted under 35 U.S.C. 154(b) by 0 days.

(21) Appl. No.: 17/267,962

(22) PCT Filed: Jul. 26, 2019

(86) PCT No.: PCT/CN2019/097933
§ 371 (c)(1),
(2) Date: Feb. 11, 2021

(87) PCT Pub. No.: WO2020/042842
PCT Pub. Date: Mar. 5, 2020

(65) Prior Publication Data
US 2021/0185109 A1 Jun. 17, 2021

(30) Foreign Application Priority Data
Aug. 31, 2018 (CN) .......................... 201811019233.0

(51) Int. Cl.
*H04L 67/02* (2022.01)
*G06F 16/957* (2019.01)
*H04L 67/568* (2022.01)

(52) U.S. Cl.
CPC .......... *H04L 67/02* (2013.01); *G06F 16/9574* (2019.01); *H04L 67/568* (2022.05)

(58) Field of Classification Search
None
See application file for complete search history.

(56) References Cited

U.S. PATENT DOCUMENTS 6,917,960 B1* 7/2005 Decasper ............ H04L 67/2847
 709/203
8,307,155 B1* 11/2012 Chatterjee ........... G06F 12/0804
 714/48

(Continued)

FOREIGN PATENT DOCUMENTS

| CN | 102541750 | 7/2012 |
| CN | 103678378 | 3/2014 |

(Continued)

OTHER PUBLICATIONS

International Search Report, issued in the corresponding PCT application No. PCT/CN2019/097933, dated Nov. 5, 2019, 5 pages.

*Primary Examiner* — Davoud A Zand
(74) *Attorney, Agent, or Firm* — Hamre, Schumann, Mueller & Larson, P.C.

(57) ABSTRACT

The present disclosure provides a page presentation method, including: receiving an access request for a target page, wherein the target page has a plurality of page blocks; and presenting a block snapshot of at least one page block in the target page stored locally in response to the access request, wherein each page block has a respective block snapshot. In addition, the present disclosure also provides a page presentation system, a computer system, and a computer-readable medium.

8 Claims, 11 Drawing Sheets

(56) References Cited

U.S. PATENT DOCUMENTS

| | | | | |
|---|---|---|---|---|
| 8,370,420 | B1* | 2/2013 | Decasper | G06F 16/9574 709/202 |
| 8,635,339 | B2* | 1/2014 | Luna | H04L 67/2876 709/224 |
| 8,711,181 | B1* | 4/2014 | Nourse | G01C 21/367 345/660 |
| 9,342,256 | B2* | 5/2016 | Peterson | G06F 11/1458 |
| 9,916,321 | B2* | 3/2018 | Sundaram | G06F 21/6218 |
| 2007/0192474 | A1* | 8/2007 | Decasper | H04L 67/1078 709/223 |
| 2008/0177994 | A1* | 7/2008 | Mayer | G06F 16/00 709/224 |
| 2008/0222273 | A1* | 9/2008 | Lakshmanan | G06F 16/9577 709/219 |
| 2009/0234947 | A1* | 9/2009 | Decasper | G06F 16/9574 709/224 |
| 2012/0084346 | A1* | 4/2012 | Mickens | G06F 16/9574 709/203 |
| 2013/0031211 | A1* | 1/2013 | Johnson | H04L 67/1008 709/218 |
| 2014/0244713 | A1* | 8/2014 | Grimm | G06F 16/1873 709/203 |
| 2014/0258238 | A1 | 9/2014 | Jin et al. | |

FOREIGN PATENT DOCUMENTS

| | | |
|---|---|---|
| CN | 103678487 | 3/2014 |
| CN | 105302672 | 2/2016 |

* cited by examiner

PAGE PRESENTATION METHOD AND SYSTEM, COMPUTER SYSTEM, AND COMPUTER READABLE MEDIUM

CROSS REFERENCE TO RELATED APPLICATIONS

This application is a National Stage Application of International Application No. PCT/CN2019/097933, filed on Jul. 26, 2019, entitled "PAGE PRESENTATION METHOD AND SYSTEM, COMPUTER SYSTEM, AND COMPUTER READABLE MEDIUM" which claims priority to CN patent Application No. 201811019233.0, filed on Aug. 31, 2018, the content of which are incorporated herein by reference in their entirety.

TECHNICAL FIELD

The present disclosure relates to a field of network technology, and in particular to a page presentation method, a page presentation system, a computer system, and a computer-readable medium.

BACKGROUND

With a rapid development of the Internet, people may use a variety of electronic devices to enjoy rich experience that the Internet brings to people, such as browsing webpages.

However, in a process of implementing a concept of the present disclosure, the inventor found that, in the related art, at least the following problems exist: in the related art, due to constraints of a network environment (network is unstable or offline) or performances of electronic devices, the user may be caused to wait a long time to browse the webpages, or page segmentations are not rendered synchronously, which may degrade user experience and even lose users.

SUMMARY

The present disclosure provides a page presentation method, a page presentation system, a computer system, and a computer-readable medium.

A first aspect of the present disclosure provides a page presentation method, comprising: receiving an access request for a target page, wherein the target page has a plurality of page blocks; and presenting a block snapshot of at least one page block in the target page stored locally in response to the access request, wherein each page block has a respective block snapshot.

According to an embodiment of the present disclosure, the method described above further includes: detecting whether an initial snapshot of the at least one page block in the target page is stored locally or not; generating an initial snapshot of each of the at least one page block in response to no initial snapshot of the at least one page block in the target page being stored; and storing the initial snapshot locally as the block snapshot.

According to an embodiment of the present disclosure, the method described above further includes: in response to the initial snapshot of the at least one page block in the target page being stored, presenting the initial snapshot of the at least one page block in the target page stored locally prior to network data of the access request is returned.

According to an embodiment of the present disclosure, the method described above further includes: subsequent to the network data of the access request is returned, generating a real snapshot of the at least one page block in the target page based on the network data, wherein the real snapshot is configured to record a real appearance of each page block of the at least one page; and updating the initial snapshot stored locally based on the real snapshot and the initial snapshot of the each of the at least one page block.

According to an embodiment of the present disclosure, said updating the initial snapshot stored locally based on the real snapshot and the initial snapshot of each of the at least one page block comprises: acquiring first version information and/or first identification information corresponding to the real snapshot of the each of the at least one page block; acquiring second version information and/or second identification information corresponding to the initial snapshot of the each of the at least one page block; detecting whether the real snapshot of the each of the at least one page block is consistent with the initial snapshot of the each of the at least one page block, based on the first version information and the second version information and/or the first identification information and the second identification information; and storing the real snapshot locally at a client to replace the initial snapshot, in response to the real snapshot of the each of the at least one page block being inconsistent with the initial snapshot of the each of the at least one page block.

A second aspect of the present disclosure provides a page presentation system, comprising: a receiving module configured to receive an access request for a target page, wherein the target page has a plurality of page blocks; and a first presentation module configured to present a block snapshot of at least one page block in the target page stored locally in response to the access request, wherein each page block has a respective block snapshot.

According to an embodiment of the present disclosure, the system described above further comprises: a detection module configured to detect whether an initial snapshot of the at least one page block in the target page is stored locally; a first generation module configured to generate an initial snapshot of the each of the at least one page block in response to no initial snapshot of the at least one page block in the target page being stored; and a storage module configured to store the initial snapshot locally as the block snapshot.

According to an embodiment of the present disclosure, the system described above further comprises: a second presentation module configured to in response to the initial snapshot of the at least one page block in the target page being stored, present the initial snapshot of the at least one page block in the target page stored locally prior to network data of the access request is returned.

According to an embodiment of the present disclosure, the system described above further comprises: a second generation module configured to subsequent to the network data of the access request is returned, generate a real snapshot of the at least one page block in the target page based on the network data, wherein the real snapshot is configured to record a real appearance of the each page block in the at least one page; and an updating module configured to update the initial snapshot stored locally based on the real snapshot and the initial snapshot of the each page block of the at least one page block.

According to an embodiment of the present disclosure, the updating module described above comprises: a first acquisition unit configured to acquire first version information and/or first identification information corresponding to the real snapshot of the each of the at least one page block; a second acquisition unit configured to acquire second version information and/or second identification information corresponding to the initial snapshot of the each of the at least one page block; a detection unit configured to detect whether the real snapshot of the each of the at least one page block is consistent with the initial snapshot of the each of the at least one page block, based on the first version information and the second version information and/or the first identification information and the second identification information; and a processing unit configured to store the real snapshot locally at a client to replace the initial snapshot, in response to the real snapshot of the each of the at least one page block being inconsistent with the initial snapshot of the each of the at least one page block.

A third aspect of the present disclosure provides a computer system, comprising: one or more processors; and a memory configured to store one or more programs, wherein when one or more programs are executed by one or more processors, the one or more processors are caused to implement the page presentation method described above.

A fourth aspect of the present disclosure provides a computer-readable medium having executable instructions stored thereon, wherein when the instructions are executed by a processor, the processor implements the page presentation method described above.

BRIEF DESCRIPTION OF THE DRAWINGS

Through the following description of the embodiments of the present disclosure with reference to the accompanying drawings, the above and other objectives, features, and advantages of the present disclosure will be more apparent. In the accompanying drawings.

DETAILED DESCRIPTION OF EMBODIMENTS

Figure 1A:
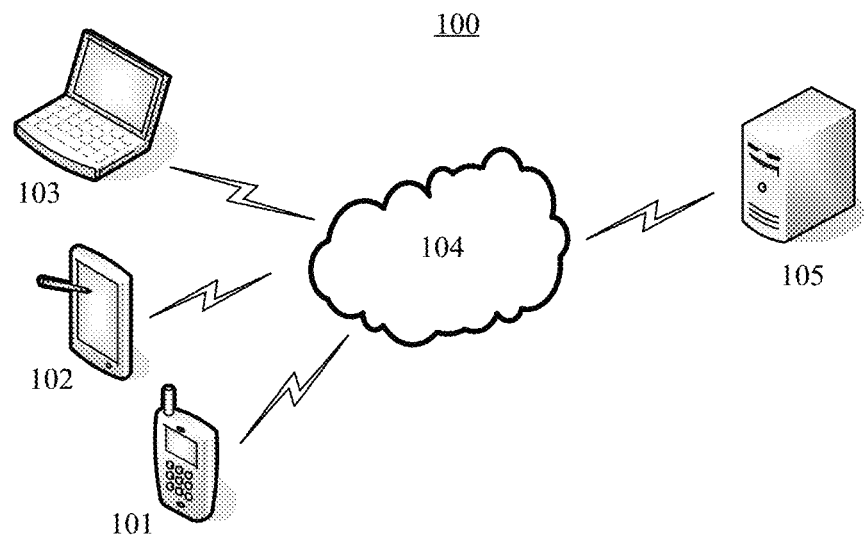
FIG. 1A schematically shows an exemplary system architecture to which a page presentation method according to an embodiment of the present disclosure may be applied.

Next, an embodiment of the present disclosure will be described with reference to the accompanying drawings. However, it should be understood that these descriptions are only illustrative and are not intended to limit the scope of the present disclosure. In the following detailed description, many specific details are set forth for ease of explanation to provide a comprehensive understanding of the embodiments of the present disclosure. However, it is obvious that one or more embodiments may also be implemented without these specific details. In addition, in the following description, the description of well-known structures and techniques is omitted to avoid unnecessarily confusing the concepts of the present disclosure.

The terms used herein are for the purpose of describing specific embodiments only and are not intended to limit the present disclosure. The terms "including", "comprising" and the like as used herein indicate the presence of said features, steps, operations, and/or components, but do not exclude the presence or addition of one or more other features, steps, operations, or components.

All terms used herein, including technical and scientific terms, have meanings generally understood by those skilled in the art, unless otherwise defined. It should be noted that the terms used herein should be interpreted as having meanings consistent with the context of this specification and should not be interpreted in an idealized or overly rigid manner.

In a case of using an expression similar to "at least one of A, B and C, etc.", generally speaking, it should be interpreted according to the meaning of the expression commonly understood by those skilled in the art (for example, "a system having at least one of A, B and C" shall be, but not limited to, a system having A alone, a system having B alone, a system having C alone, a system having A and B, a system having A and C, a system having B and C, and/or a system having A, B, C, etc.). Those skilled in the art should also understand that essentially any transitional conjunctions and/or phrases representing two or more optional items, whether in the description, claims or drawings, should be understood to have a possibility of including one of the items, any one of the items, or two items. For example, the phrase "A or B" should be understood to include the possibilities of "A" or "B", or "A and B."

The present disclosure provides a page presentation method, including: receiving an access request for a target page, where the target page has a plurality of page blocks; and presenting a block snapshot of at least one page block in the target page stored locally in response to the access request, where each page block has a respective block snapshot.

In presenting pages under related technologies, users have to wait for a long time to browse the webpage or page segmentations are un-synchronously rendered, due to instability of the network, even offline, or a restriction of performances of electronic devices. According to the present disclosure, browsing of the page may not be restricted by the network environment or the performances of the electronic device, achieving a technical effect of page appearance caching and instant response, thereby greatly reducing the time for users to wait for page loading in browsing the page, giving the users an visual effect of opening the page instantly, and providing user experience like a native application.

FIG. 1A schematically shows an exemplary system architecture 100 for implementing a page presentation method according to an embodiment of the present disclosure. It should be noted that, FIG. 1A is only an example of the system architecture to which the embodiments of the present disclosure may be applied, so as to help those skilled in the art understand the technical content of the present disclosure, but it does not mean that the embodiments of the present disclosure may not be applied to other devices, systems, environments, or scenarios.

As shown in FIG. 1A, the system architecture 100 according to an embodiment may include terminal devices 101, 102, 103, a network 104, and a server 105. The network 104 is used to provide a medium for communication links between the terminal devices 101, 102, 103 and the server 105. The network 104 may include various connection types, such as wired, wireless communication links, or optical fiber cables.

A user may use the terminal devices 101, 102, and 103 to interact with the server 105 through the network 104 to receive or transmit messages and so on. Various communication client applications, such as shopping applications, web browser applications, search applications, instant messaging tools, email clients, social platform software, etc., may be installed on the terminal devices 101, 102, 103 (for example only).

The terminal devices 101, 102, and 103 may be various electronic devices with a display screen and capable of web browsing, including but not limited to smart phones, tablet computers, laptop computers, desktop computers, and so on.

The server 105 may be a server that provides various services, for example, a background management server (just an example) that provides support for websites browsed by users using the terminal devices 101, 102, and 103. The background management server may analyze and process the received user request and other data, and feedback a processing result (for example, a webpage, information, or data acquired or generated according to the user request) to the terminal device.

It should be noted that the page presentation method provided by the embodiments of the present disclosure may generally be executed by the terminal device 101, 102, or 103, or may also be executed by other terminal devices different from the terminal device 101, 102, or 103. Correspondingly, a page presentation system provided by the embodiments of the present disclosure may also be provided in the terminal device 101, 102, or 103, or provided in other terminal devices different from the terminal device 101, 102, or 103.

It should be understood that the numbers of terminal devices, networks, and servers in FIG. 1A are merely illustrative. According to implementation needs, there may be any number of terminal devices, networks, and servers.

Figure 1B:
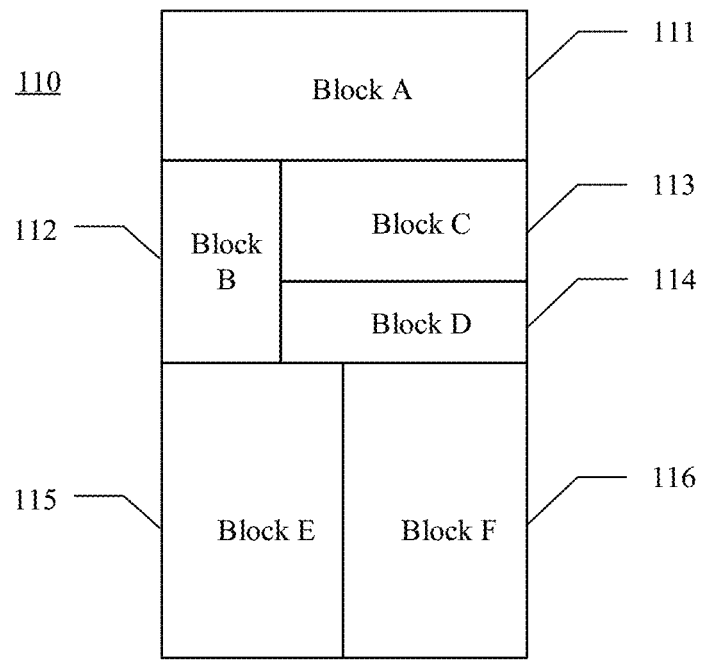
FIG. 1B schematically shows an application scenario in which a page presentation method according to an embodiment of the present disclosure may be applied.

FIG. 1B schematically shows an application scenario in which the page presentation method of an embodiment of the present disclosure may be applied.

As shown in FIG. 1B, a page 110 may have a plurality of blocks such as a block A (111), a block B (112), a block C (113), a block D (114), a block E (115), and a block F (116). The display of the page may be completed by loading at least one of a plurality of blocks on demand through scripts such as JavaScript according to different access requests. Normally, the blocks may be loaded in order from top to bottom and from left to right.

It should be understood that a number of blocks in FIG. 1B is only illustrative. According to an actual situation of the page, any number of blocks may be provided.

In order to facilitate understanding of the inventive concept of the present disclosure, FIG. 1B only schematically shows layouts of the plurality of blocks in the page 110 described above, and is not a limitation on the layout of each block. According to an actual situation of the page, the plurality of blocks may have different layouts. The present disclosure does not limit the layouts, and block content of each block is not limited here either.

Figure 2:
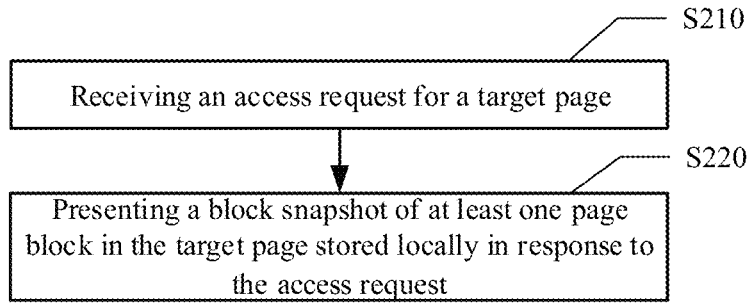
FIG. 2 schematically shows a flowchart of a page presentation method according to an embodiment of the present disclosure.

FIG. 2 schematically shows a flowchart of a page presentation method according to an embodiment of the present disclosure.

As shown in FIG. 2, the method may include operation S210 and operation S220.

In the operation S210, an access request for a target page is received.

In the operation S220, in response to the access request, a block snapshot of at least one page block in the target page stored locally is presented.

According to the embodiments of the present disclosure, the target page may be a browser page of a mobile terminal, or a browser page of a portable electronic device terminal. In other words, there is no limitation on an electronic device used to browse a page. Furthermore, there are no limitations on an operating system of an electronic device and a browser used to browse a page. It may be the Google (Chrome) browser that supports the Android operating system, or the Safari browser that supports the Apple operating system (iphone Operating System, referred to as iOS), or the Internet Explorer (IE for short) of the Microsoft.

According to the embodiments of the present disclosure, the target page has a plurality of page blocks (as shown in FIG. 1B), and each page block has a corresponding block snapshot. The block snapshot of one page block may be the same as or different from the respective block snapshot of another page block. The present disclosure does not make a limit.

According to the embodiments of the present disclosure, the block snapshot of the page block is stored locally, such as stored in a local storage. After receiving an access request for the target page, the block snapshot corresponding to the at least one page block in the target page may be acquired locally and presented to the user.

It should be noted that a display screen of the electronic device limits a range of a visible area, and an area outside the visible area is a non-visible area. The user may only see content of a page on the display screen of the electronic device, and a size of the display screen is limited, a size of the target page is usually much larger than the size of the display screen, therefore, the target page may not be presented on the display screen at one time, but may only be partially presented on the screen. In this connection, the target page is divided into a visible area and a non-visible area by the display screen. The user currently sees a target page in the visible area, and the user currently may not see a target page in the non-visible area. The non-visible area is only relative to the visible area. According to an operation performed by the user on the page, the visible area and the non-visible area are relatively changed. In a process that the user browses the target page, performing a scroll operation on the page may cause a page that is originally located in the non-visible area to locate in the visible area. Correspondingly, acquiring a block snapshot corresponding to at least one page block in the target page locally and presenting the block snapshot to the user may be implemented in two manners.

In a first manner, block snapshots of all page blocks in the target page are acquired locally and presented to the user.

In a second manner, block snapshots of all page blocks in the visible area of the target page are acquired locally and presented to the user.

Compared with the first manner, in the second manner, as the block snapshots are stored locally, there is a little difference in time between acquiring and presenting the block snapshots of all page blocks in the target page and acquiring and presenting the block snapshots of all page blocks in the visible area of the target page, which may achieve a technical effect of instantaneous opening of a page, but only acquiring and presenting the block snapshots of all page blocks in the visible area of the target page may achieve a technical effect of instantaneous opening of the page, while reducing an energy consumption of an electronic device and extending of a life of the electronic device.

In related technologies, in a case that the network is poor or even offline, a progressive web application (PWA) may be used to achieve the technical effect of quickly opening the page. However, due to a core technology of the progressive web application, such as Serice Workers, only the Chrome browser of the Android system is supported currently. The Safari browser of the IOS system and the IE browser of the Microsoft are not well supported, and scenes are severely limited. The technical effect of quickly opening the page may also be achieved in mobile native applications (hereinafter referred to as APP), such as Android applications and IOS applications, but a development cost of App native applications is high and a development cycle of App native applications is long, and it may not be applicable to all pages.

According to the embodiments of the present disclosure, it is possible to at least partially overcome technical problems of causing the users to wait for a long time to browse the webpage or unsynchronized rendering of page segmentations due to an instability of the network, even offline, or a restriction of performances of electronic devices when presenting pages in related technologies. Therefore, it may not be restricted by the network environment or the performances of the electronic device when browsing the page, and realize technical effects of page appearance caching and instant response, greatly reduce the time for users to wait for page loading when browsing the page, give the users an visual effect of opening the page instantly, and provide the users with same user experience as native applications.

The page presentation method shown in FIG. 2 will be further described with reference to FIG. 3A to FIG. 3H in conjunction with specific embodiments.

Figure 3A:
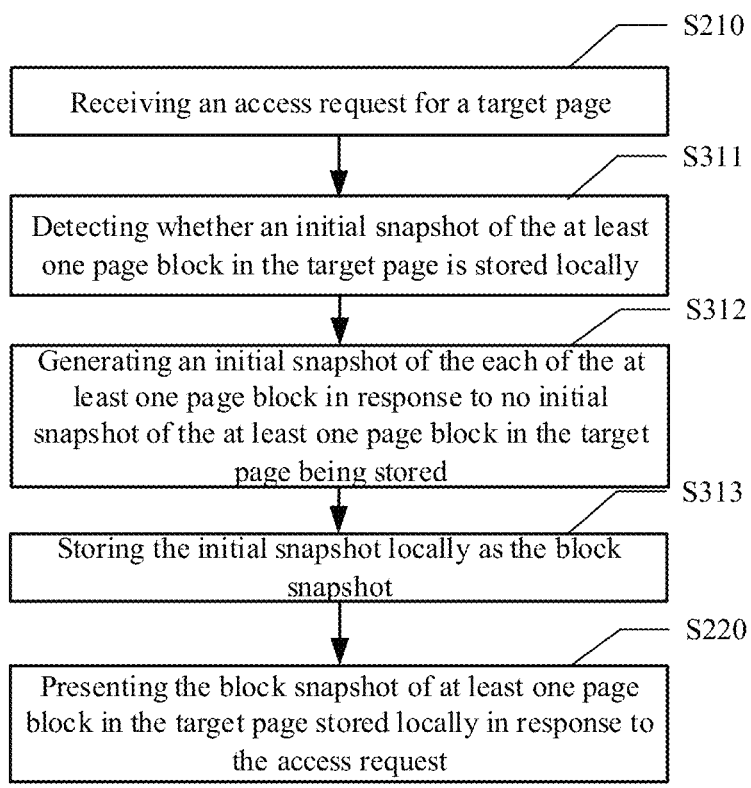
FIG. 3A schematically shows a flowchart of a page presentation method according to another embodiment of the present disclosure.

FIG. 3A schematically shows a flowchart of a page presentation method according to another embodiment of the present disclosure.

As shown in FIG. 3A, in addition to the operation S210 and the operation S220 described above, the method may also include operation S311 to operation S313.

In the operation S311, it is detected whether an initial snapshot of at least one page block in the target page is stored locally or not.

In the operation S312, in response to no initial snapshot of the at least one page block in the target page being stored, an initial snapshot of each of the at least one page block is generated.

In the operation S313, the initial snapshot is stored locally as a block snapshot.

According to an embodiment of the present disclosure, after the operation S210 (receiving an access request for the target page), it is possible to detect whether an initial snapshot of the page block in the target page is stored locally or not, and if not, the initial snapshot of the page block is generated, and the initial snapshot is stored locally as a block snapshot, so that in response to the access request, the block snapshot of at least one page block in the target page stored locally may be presented.

Figure 3B:
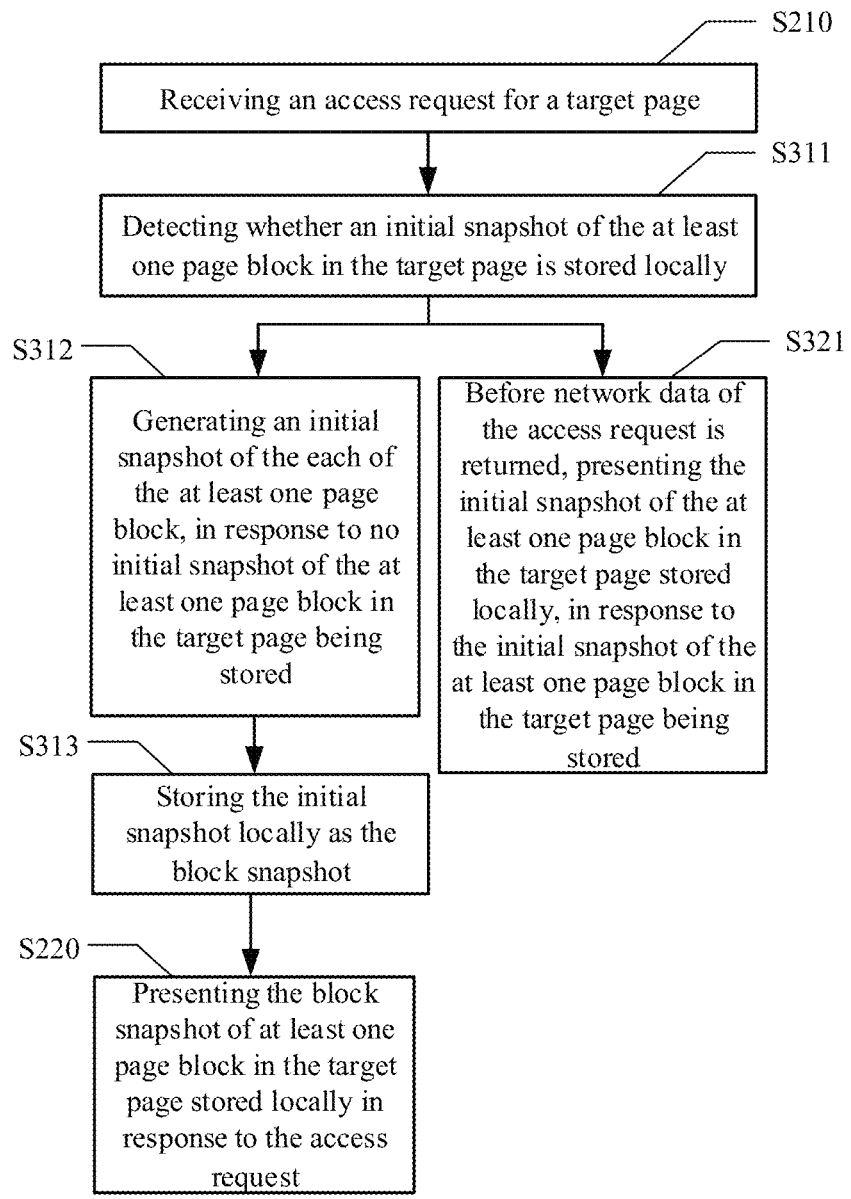
FIG. 3B schematically shows a flowchart of a page presentation method according to another embodiment of the present disclosure.
Figure 3C:
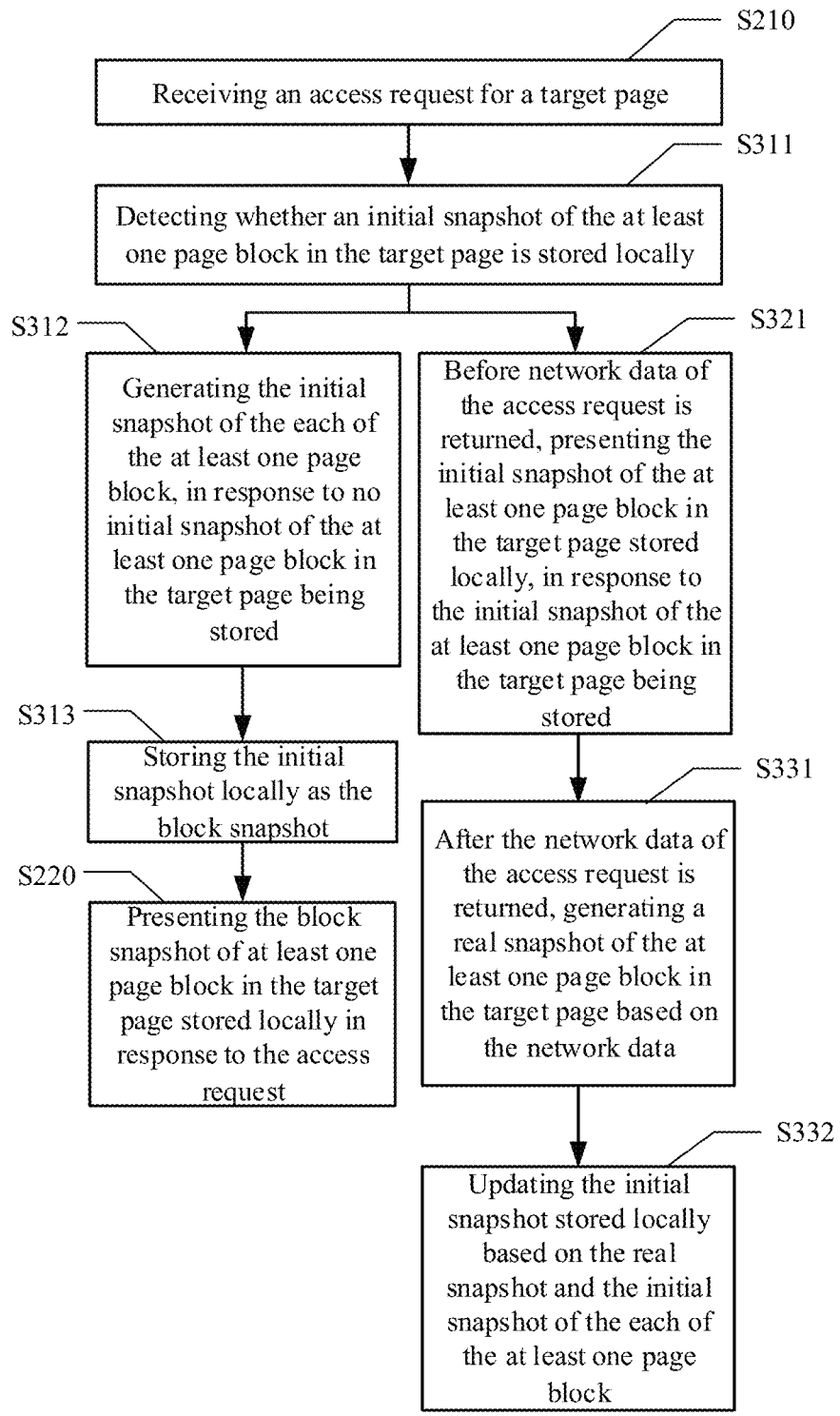
FIG. 3C schematically shows a flowchart of a page presentation method according to still another embodiment of the present disclosure.
Figure 3D:
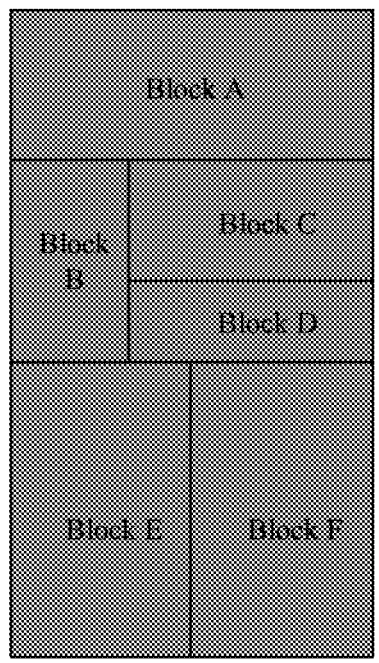
FIG. 3D schematically shows an appearance diagram of an initial snapshot of a page block generated according to an embodiment of the present disclosure.

It should be noted that the initial snapshot corresponding to one page block may be the same (as shown in FIG. 3D) as or different from the initial snapshot corresponding to another page block. Any picture may be manually set as the initial snapshot, and the initial snapshot is also generated according to a function of the page block, which is not limited here.

According to the embodiments of the present disclosure, when the initial snapshot is not stored locally, the initial snapshot is generated, which may reduce the waiting time of the user when the network is unstable, and realize the technical effect of opening the page instantly.

FIG. 3B schematically shows a flowchart of a page presentation method according to another embodiment of the present disclosure.

As shown in FIG. 3B, in addition to the operation S210, the operation S220, and the operation S311 to the operation S313, the method may further include operation S321: before network data of the access request is returned, presenting the initial snapshot of the at least one page block in the target page stored locally in response to the initial snapshot of at least one page block in the target page being stored.

According to an embodiment of the present disclosure, after receiving a user's access request for the target page, the server may return the network data of the page block according to relevant information carried in the network request. However, before the network data is returned, the related art shows a page appearance to the user is blank or indicates that the page is in a loading state. According to an embodiment of the present disclosure, as the block snapshot of the page block is stored locally, the user may be shown the initial snapshot of the page block in the target page stored locally before the network data is returned, so that the user may see the initial snapshot of the block, and avoid seeing the page appearance that is blank or indicates that the page is in a loading state.

According to an embodiment of the present disclosure, in a case that an initial snapshot of at least one page block in the target page exists, the initial snapshot of the at least one page block in the target page is presented before the network data of the access request is returned, thereby reducing the waiting time of users when the network is unstable, achieving the technical effect of opening the page instantly, and improve the user experience.

FIG. 3C schematically shows a flowchart of a page presentation method according to still another embodiment of the present disclosure.

As shown in FIG. 3C, the method may include operation S331 and operation S332 in addition to the foregoing operation S210, operation S220, operation S311 to operation S313, and operation S321.

In the operation S331, after the network data of the access request is returned, a real snapshot of the at least one page block in the target page is generated based on the network data.

In the operation S332, the initial snapshot stored locally is updated based on the real snapshot and the initial snapshot of each of the at least one page block.

According to an embodiment of the present disclosure, after data returned for the network request is acquired, a display appearance of the initial snapshot is covered by a real appearance and content of a page. What the user sees is the real appearance of the page, and may further draw a real appearance picture of the page block based on a real display appearance of the page, and generate the real snapshot.

Specifically, the HyperText Markup Language (HTML) code may be formatted and inserted into the corresponding page block for browser rendering. At this time, the real appearance and content may cover the snapshot appearance, and the user may see the final real appearance. In order to provide users with a better visual experience when the network conditions are not good in the future, Scalable Vector Graphics (SVG) and canvas such as Canvas may be used to draw real appearances of the blocks, and convert into Base64 picture, as the real snapshots used to record the real appearances of the page blocks, as new snapshots of the blocks. Specifically, the method for generating a real snapshot based on network data of a page is not limited in the present disclosure, and those skilled in the art may make adaptive choices based on their own experience and actual needs.

According to the embodiments of the present disclosure, real snapshots are generated based on network data, so that the snapshots may reflect the real appearances of the page block, and provide users with an effect of opening the page instantly.

FIG. 3D schematically shows an appearance diagram of an initial snapshot of a page block generated according to an embodiment of the present disclosure.

As shown in FIG. 3D, each of a plurality of blocks such as a block A, a block B, a block C, a block D, a block E, and a block F has a corresponding initial snapshot. Different initial snapshots may be set for each block according to actual needs.

Figure 3E:
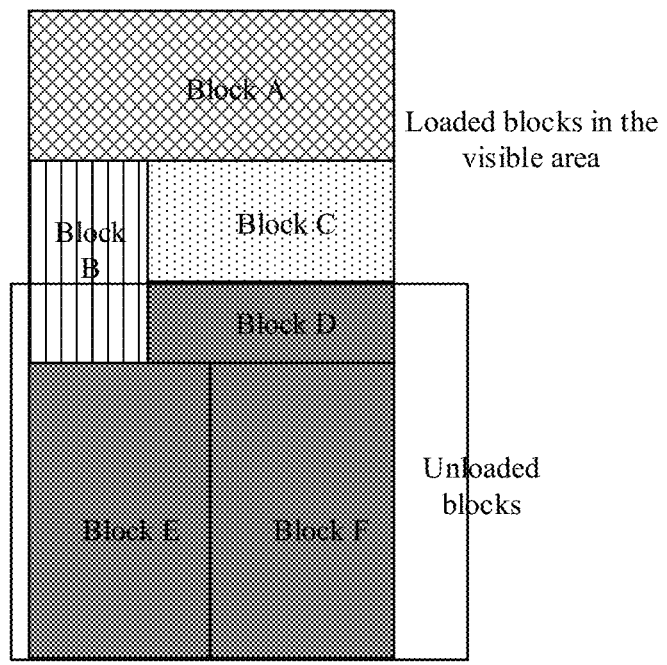
FIG. 3E schematically shows an appearance diagram of an initial snapshot of a page block updated according to an embodiment of the present disclosure.

FIG. 3E schematically shows an appearance diagram of an initial snapshot of a page block updated according to an embodiment of the present disclosure.

As shown in FIG. 3E, after the network data of the access request is returned, the block A, the block B, and the block C are located in the visible area. Therefore, the real snapshots, generated based on the network data, corresponding to the block A, the block B, and the block C, cover the initial snapshots corresponding to the block A, the block B, and the block C shown in FIG. 3D. In response to the user seeing the final real appearances of the block A, the block B, and the block C, the real snapshots corresponding to the real appearances are stored locally.

The block D, the block E, and the block F are located in the non-visible area, and the real snapshots, generated based on the network data, corresponding to the block D, the block E, and the block F do not cover the initial snapshots corresponding to the block D, the block E, and the block F shown in FIG. 3D. The user still sees the initial snapshots corresponding to the block D, the block E, and the block F.

Figure 3F:
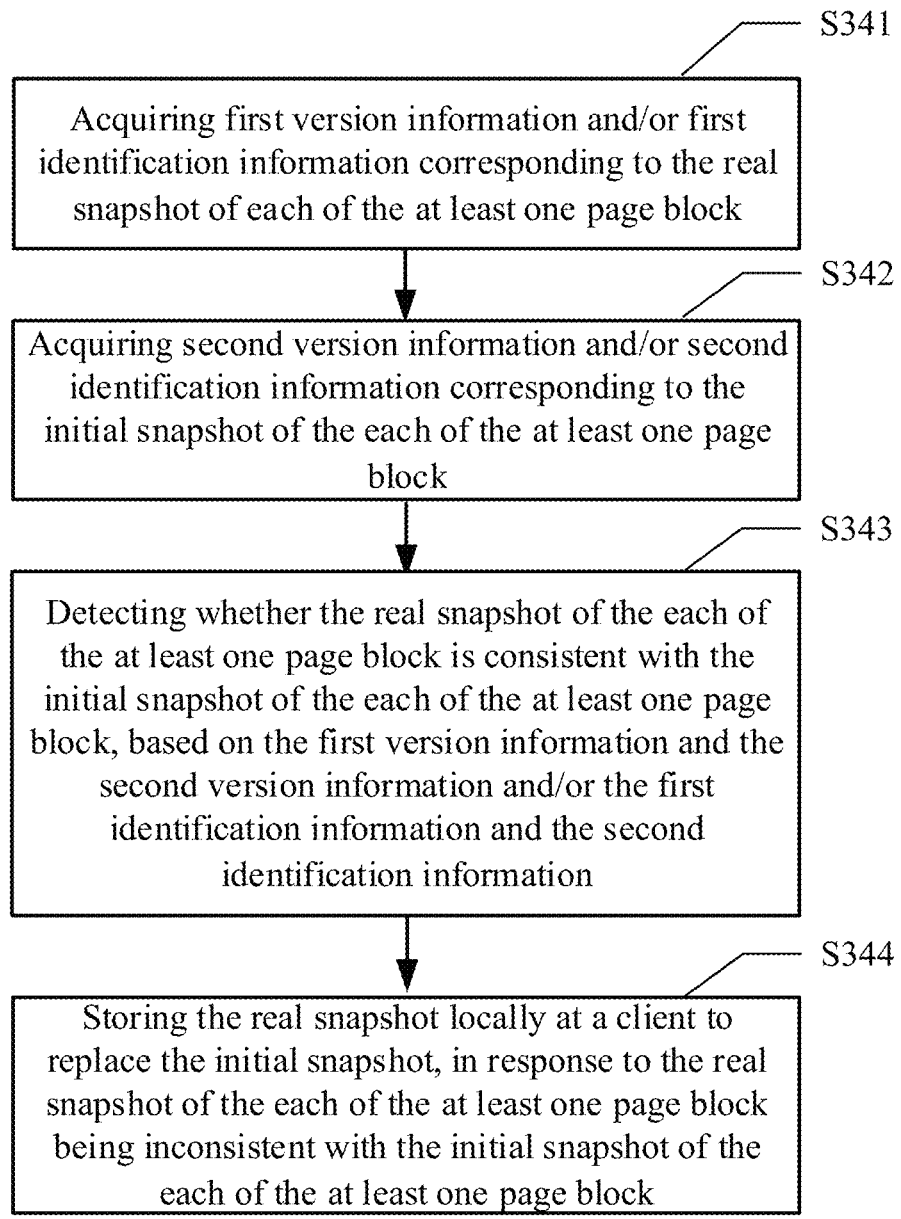
FIG. 3F schematically shows a flowchart of updating the initial snapshot stored locally based on the real snapshot and the initial snapshot of each page block in at least one page block according to an embodiment of the present disclosure.

FIG. 3F schematically shows a flowchart of updating the initial snapshots stored locally based on the real snapshot and the initial snapshot of each page block in at least one page block according to an embodiment of the present disclosure.

As shown in FIG. 3F, the method may include operation S341 to operation S344 in addition to operations.

In the operation S341, first version information and/or first identification information corresponding to the real snapshot of each of the at least one page block is acquired.

In the operation S342, second version information and/or the second identification information corresponding to the initial snapshot of each of the at least one page block is acquired.

In the operation S343, based on the first version information and the second version information and/or the first identification information and the second identification information, it is detected whether the real snapshot of each of the at least one page block is consistent with the initial snapshot of each of the at least one page block or not.

In the operation S344, in response to the real snapshot of each of the at least one page block being not consistent with the initial snapshot of each of the at least one page block, the real snapshot is stored locally on client to replace the initial snapshot.

According to the embodiments of the present disclosure, in order to provide users with a better visual experience, for page blocks with real snapshots, it is possible to update the initial snapshots stored locally based on the real snapshots and the initial snapshots of the page blocks, that is, to determine whether the appearances of the real snapshots are updated or not, if so, store the real snapshots locally on the client to replace the initial snapshots.

Considering that, on the one hand, updating application version may cause a number and a layout of the page blocks in the target page to change; and on the other hand, each access operation of the user may also cause a real snapshot of a page block to be different from an initial snapshot of the page block. Therefore, according to the embodiments of the present disclosure, different judgment standards may be used to determine whether an appearance of a real snapshot is updated or not. It is understandable that the judgment standards may include, but not limited to, version numbers and file identification information of a page, such as a check code (Message Digest Algorithm 5, referred to as MD5).

In a first example, it is determined whether an appearance of the real snapshot is updated or not according to version information.

It is understandable that an updated application corresponds to a different version number. Therefore, it may determine whether an appearance of the real snapshot is updated or not based on a version number. If a version number corresponding to the real snapshot is different from a version number corresponding to the initial snapshot, it indicates that the appearance of the real snapshot is updated, and the real snapshot is stored locally on the client instead of the initial snapshot. If the version number corresponding to the real snapshot is the same as the version number corresponding to the initial snapshot, it indicates that the appearance of the real snapshot is not updated and the initial snapshot is retained.

In a second example, it is determined whether an appearance of the real snapshot is updated or not according to MD5.

It is understandable that the same page block generates a unique MD5 check code by using the MD5 algorithm. If a MD5 check code corresponding to the real snapshot is different from a MD5 check code corresponding to the initial snapshot, it indicates that the appearance of the real snapshot is updated, and the real snapshot is stored locally on the client instead of the initial snapshot. If a MD5 check code corresponding to the real snapshot is the same as a MD5 check code corresponding to the initial snapshot, it indicates that the appearance of the real snapshot is not updated and the original snapshot is retained.

In a third example, it is determined whether an appearance of the real snapshot is updated or not according to the version information and the MD5.

It is understandable that, for the same version of the application, it may also be a case that an appearance of a block is updated. Therefore, the present disclosure also provides for determining whether the appearance of the real snapshot is updated or not based on the version number (method 1) combined with the MD5 (method 2), which will not be repeated here.

According to the embodiments of the present disclosure, the initial snapshot is updated according to the version information and the identification information of the initial snapshot and the real snapshot, so that the locally stored initial snapshot records the real appearance of the page block, and brings the user a real browsing experience.

Figure 3G:
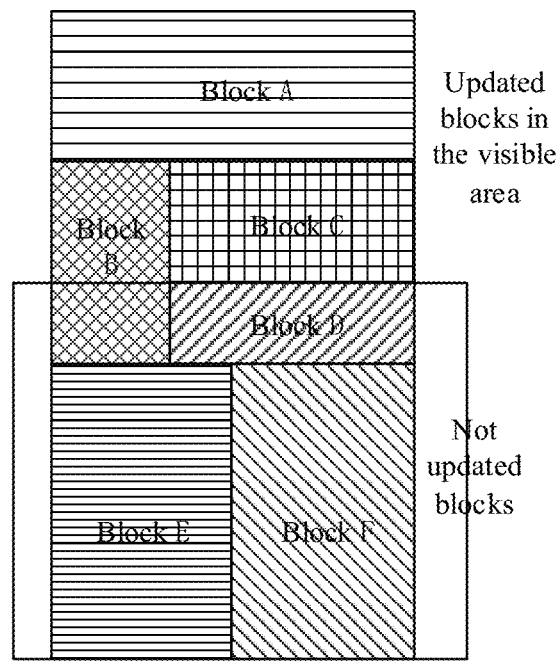
FIG. 3G schematically shows an appearance diagram of an initial snapshot of a page block updated according to another embodiment of the present disclosure.

FIG. 3G schematically shows an appearance diagram of an initial snapshot of a page block updated according to another embodiment of the present disclosure.

As shown in FIG. 3G, compared to the appearance diagram shown in FIG. 3E, after the updated snapshot is loaded again, the initial snapshots of the block A, the block B, and the block C are updated, while the real snapshots corresponding to the block D, the block E, and the block F do not load due to the block D, the block E, and the block F are located in the non-available area.

Figure 3H:
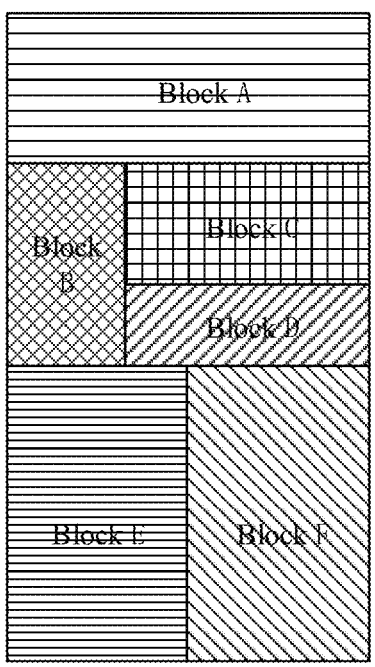
FIG. 3H schematically shows an appearance diagram of an initial snapshot of a page block updated according to still another embodiment of the present disclosure.

FIG. 3H schematically shows an appearance diagram of an initial snapshot of a page block updated according to still another embodiment of the present disclosure.

After updating the block snapshot of the page block, a normal display appearance of a page is shown in FIG. 3H, and waiting for a next access request of the user for the page.

It may be seen that, according to the embodiments of the present disclosure, after each access request returns the network data, a real snapshot recording the real display appearance of the page block may be obtained according to the real appearance of each page block in the page. According to the version number and/or the file identification information, it may determine whether it is necessary to update the initial snapshot of the page block stored locally. In other words, the initial snapshot stored locally may be empty before the user generates the access request, but after the user performs the access operation, the real snapshot may be drawn according to the real display appearance of each page block in the page presented to the user, and stored locally. Therefore, when the user is in a poor network environment next time, the user may be shown the real snapshot recording the real display appearance that was presented before, so that the user may get the experience of the native application.

Figure 4:
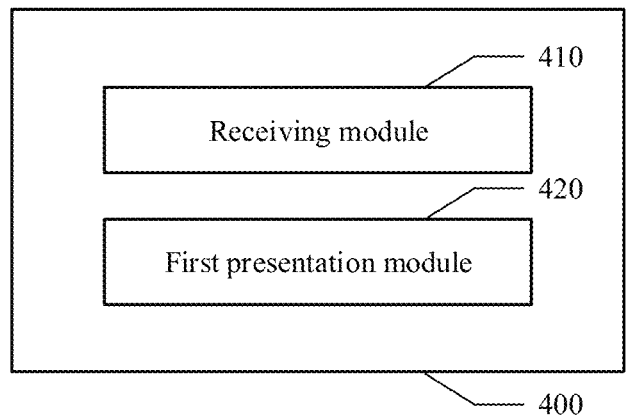
FIG. 4 schematically shows a block diagram of a page presentation system according to an embodiment of the present disclosure.

FIG. 4 schematically shows a block diagram of a page presentation system according to an embodiment of the present disclosure.

As shown in FIG. 4, the page presentation system 400 may include a receiving module 410 and a first presentation module 420.

The receiving module 410 is configured to receive an access request for a target page, and the target page has a plurality of page blocks.

The first presentation module 420 is configured to present a block snapshot of at least one page block in the target page stored locally in response to the access request, where each page block has a corresponding block snapshot.

According to the embodiments of the present disclosure, it is possible to at least partially overcome technical problems of causing the users to wait for a long time to browse the webpage or unsynchronized rendering of page segmentations due to an instability of the network, even offline, or a restriction of performances of electronic devices when presenting pages in related technologies. Therefore, it may not be restricted by the network environment or the performances of the electronic device when browsing the page, and realize technical effects of page appearance caching and instant response, greatly reduce the time for users to wait for page loading when browsing the page, give the users an visual effect of opening the page instantly, and provide the users with same user experience as native applications.

Figure 5A:
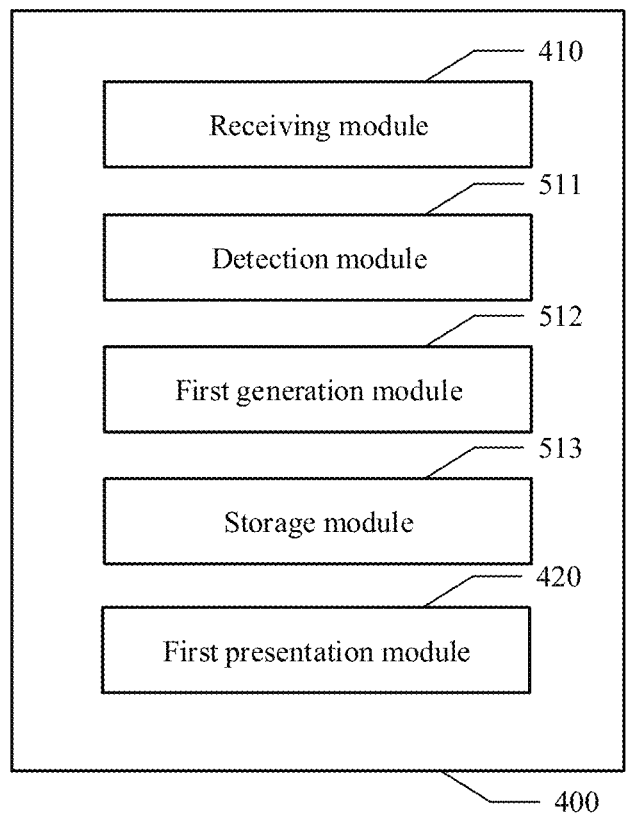
FIG. 5A schematically shows a block diagram of a page presentation system according to another embodiment of the present disclosure.

FIG. 5A schematically shows a block diagram of a page presentation system according to another embodiment of the present disclosure.

As shown in FIG. 5A, the page presentation system 400 may include a detection module 511, a first generation module 512, and a storage module 513 in addition to the receiving module 410 and the first presentation module 420 described above.

The detection module 511 is configured to detect whether an initial snapshot of at least one page block in the target page is stored locally or not.

The first generation module 512 is configured to generate an initial snapshot of each of the at least one page block in response to the initial snapshot of the at least one page block in the target page being not stored.

The storage module 513 is configured to store the initial snapshot locally as a block snapshot.

According to the embodiments of the present disclosure, in response to the initial snapshot being not stored locally, the initial snapshot is generated, which may reduce the waiting time of the user when the network is unstable, and realize the technical effect of opening the page instantly.

Figure 5B:
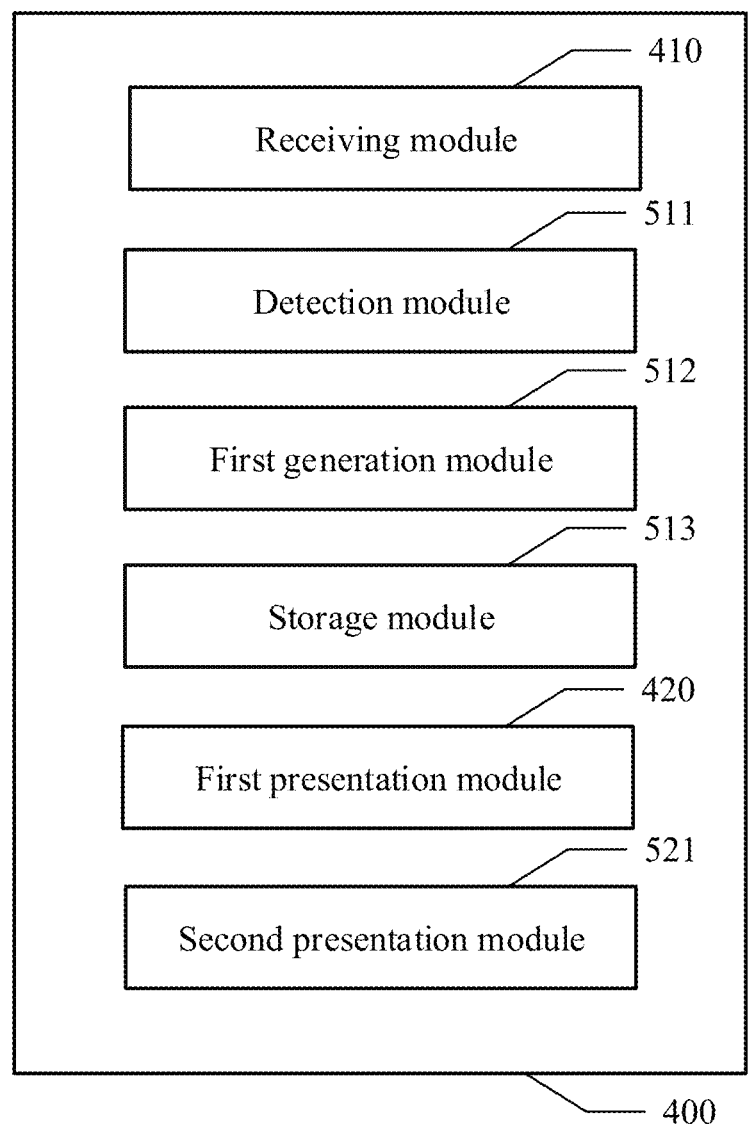
FIG. 5B schematically shows a block diagram of a page presentation system according to another embodiment of the present disclosure.

FIG. 5B schematically shows a block diagram of a page presentation system according to another embodiment of the present disclosure.

As shown in FIG. 5B, the page presentation system 400 may further include a second presentation module 521 in addition to the receiving module 410, the first presentation module 420, the detection module 511, the first generation module 512, and the storage module 513 described above. The second presentation module 521 is configured to present the initial snapshot of the at least one page block in the target page stored locally, in response to the initial snapshot of the at least one page block in the target page being stored, before the network data of the access request is returned.

According to the embodiments of the present disclosure, in a case that an initial snapshot of at least one page block in the target page exists, before the network data of the access request is returned, the initial snapshot of the at least one page block in the target page is presented. When the user is in an unstable network, the user may still see the display appearance that is not blank or in the loading state, while reducing the user's waiting time, achieving the technical effect of opening the page instantly, and improving the user experience.

Figure 5C:
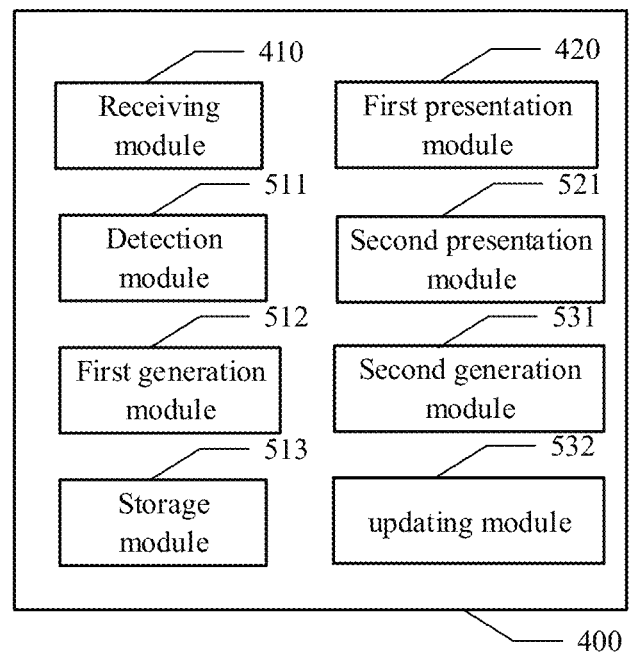
FIG. 5C schematically shows a block diagram of a page presentation system according to still another embodiment of the present disclosure.

FIG. 5C schematically shows a block diagram of a page presentation system according to still another embodiment of the present disclosure.

As shown in FIG. 5C, the page presentation system 400 may further include a second generation module 531 and an updating module 532 in addition to the receiving module 410, the first presentation module 420, the detection module 511, the first generation module 512, the storage module 513, and the second presentation module 521 described above.

The second generation module 531 is configured to generate a real snapshot of the at least one page block in the target page based on the network data after the network data of the access request is returned.

The updating module 532 is configured to update the initial snapshot stored locally based on the real snapshot and the initial snapshot of each of the at least one page block.

According to the embodiments of the present disclosure, a real snapshot is generated based on the network data, so that the snapshot may reflect the real appearance of the page block, and provide the user with an effect of opening the page instantly.

Figure 5D:
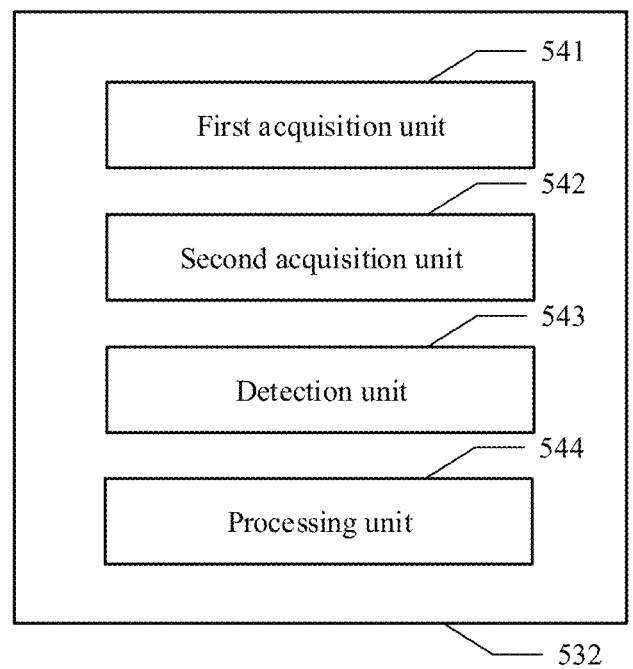
FIG. 5D schematically shows a block diagram of an updating module according to an embodiment of the present disclosure.

FIG. 5D schematically shows a block diagram of an updating module according to an embodiment of the present disclosure.

As shown in FIG. 5D, the updating module 532 may include a first acquisition unit 541, a second acquisition unit 542, a detection unit 543, and a processing unit 544.

The first acquisition unit 541 is configured to acquire first version information and/or first identification information corresponding to the real snapshot of each of the at least one page block.

The second acquisition unit 542 is configured to acquire second version information and/or second identification information corresponding to the initial snapshot of each of the at least one page block.

The detection unit 543 is configured to detect whether the real snapshot of the each of the at least one page block is consistent with the initial snapshot of the each of the at least one page block or not based on the first version information and the second version information and/or the first identification information and the second identification information.

The processing unit 544 is configured to store the real snapshot locally on the client to replace the initial snapshot in response to the real snapshot of the each of the at least one page block being inconsistent with the initial snapshot of the each of the at least one page block.

According to the embodiments of the present disclosure, the initial snapshot is updated according to the version information and the identification information of the initial snapshot and the real snapshot, so that the locally stored initial snapshot records the real appearance of the page block, and brings the user a real browsing experience.

According to the embodiments of the present disclosure, any number of modules, units, or at least part of functions of any number of them may be implemented in one module. Any one or more of the modules, units, and sub-units according to the embodiments of the present disclosure may be split into multiple modules for implementation. Any one or more of the modules and units according to the embodiments of the present disclosure may be at least partially implemented as hardware circuits, such as a field programmable gate array (FPGA), a programmable logic array (PLA), a system on a chip, a system on a substrate, a system on a package, an application specific integrated circuit (ASIC), or may be implemented by hardware or firmware in any other reasonable way that integrates or encapsulates the circuit, or may be implemented by any one of the three implementation modes of software, hardware and firmware or an appropriate combination thereof. Alternatively, one or more of the modules and units according to the embodiments of the present disclosure may be at least partially implemented as a computer program module, and when executed, perform the corresponding functions.

For example, any number of the receiving module 410, the first presentation module 420, the detection module 511, the first generation module 512, the storage module 513, the second presentation module 521, the second generation module 531, and the updating module 532 may be combined into one module for implementation, or any one of the modules may be split into multiple modules. Alternatively, at least part of the functions of one or more of these modules may be combined with at least part of the functions of other modules and implemented in one module. According to an embodiment of the present disclosure, at least one of the receiving module 410, the first presentation module 420, the detection module 511, the first generation module 512, the storage module 513, the second presentation module 521, the second generation module 531, and the updating module 532 may be implemented at least partially as hardware circuits, such as a field programmable gate array (FPGA), a programmable logic array (PLA), a system on a chip, a system on a substrate, a system on a package, an application specific integrated circuit (ASIC), or may be implemented by hardware or firmware in any other reasonable way that integrates or encapsulates the circuit, or may be implemented by any one of the three implementation modes of software, hardware, and firmware or an appropriate combination of any of them. Alternatively, at least one of the receiving module 410, the first presentation module 420, the detection module 511, the first generation module 512, the storage module 513, the second presentation module 521, the second generation module 531, and the updating module 532 may be at least partially implemented as a computer program module, and when executed, perform the corresponding functions.

Figure 6:
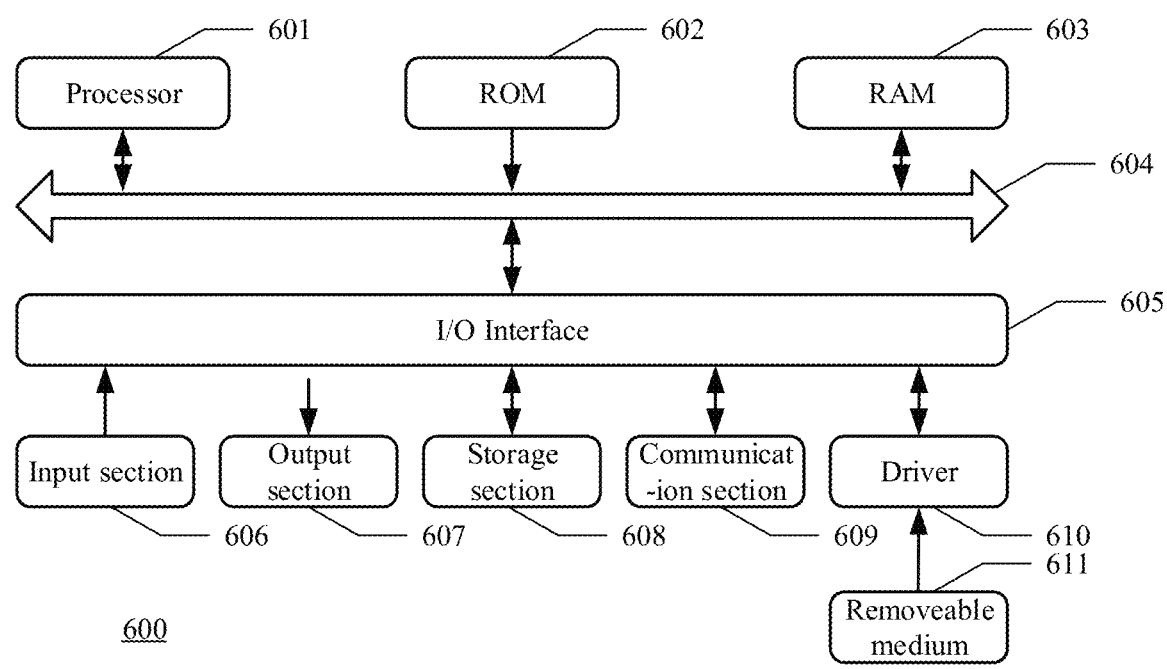
FIG. 6 schematically shows a block diagram of a computer system suitable for implementing a page presentation method according to an embodiment of the present disclosure.

FIG. 6 schematically shows a block diagram of a computer system suitable for implementing a page presentation method according to an embodiment of the present disclosure. The computer system shown in FIG. 6 is only an example, and should not bring any limitation to the function and scope of use of the embodiments of the present disclosure.

As shown in FIG. 6, a computer system 600 according to an embodiment of the present disclosure includes a processor 601, which may execute various appropriate actions and processing according to a program stored in a read only memory (ROM) 602 or a program loaded into a random access memory (RAM) 603 from a storage section 608. The processor 601 may, for example, include a general-purpose microprocessor (for example, CPU), an instruction set processor and/or a related chipset and/or a special-purpose microprocessor (for example, an application specific integrated circuit (ASIC)), and the like. The processor 601 may also include an on-board memory for caching purposes. The processor 601 may include a single processing unit or multiple processing units for executing different actions of the method flow according to the embodiments of the present disclosure.

In the RAM 603, various programs and data required for the operation of the system 600 are stored. The processor 601, the ROM 602 and the RAM 603 are connected to each other through a bus 604. The processor 601 executes various operations of the method flow according to the embodiments of the present disclosure by executing the programs in the ROM 602 and/or the RAM 603. It should be noted that the program may also be stored in one or more memories other than the ROM 602 and the RAM 603. The processor 601 may also execute various operations of the method flow according to the embodiments of the present disclosure by executing the programs stored in the one or more memories.

According to an embodiment of the present disclosure, the system 600 may further include an input/output (I/O) interface 605 which is also connected to the bus 604. The system 600 may further include one or more of the following components connected to the I/O interface 605: an input section 606 including a keyboard, a mouse, etc.; an output section 607 including a cathode ray tube (CRT), a liquid crystal display (LCD), etc. and a speaker, etc.; a storage section 608 including a hard disk, etc.; and a communication section 609 including a network interface card such as a LAN card, a modem, and the like. The communication section 609 performs communication processing via a network such as the Internet. A driver 610 is also connected to the I/O interface 605 as required. A removable medium 611, such as a magnetic disk, an optical disk, a magneto-optical disk, a semiconductor memory, and the like, is installed on the driver 610 as required, so that the computer program read therefrom is installed into the storage section 608 as needed.

The method flow according to the embodiments of the present disclosure may be implemented as a computer software program. For example, the embodiments of the present disclosure include a computer program product including a computer program carried on a computer-readable storage medium. The computer program includes a program code for execution of the method shown in the flowchart. In such an embodiment, the computer program may be downloaded and installed from the network through the communication section 609, and/or installed from the removable medium 611. When the computer program is executed by the processor 601, the above-mentioned functions defined in the system of the embodiment of the present disclosure are performed. According to the embodiments of the present disclosure, the above-described systems, apparatuses, devices, modules, units, etc. may be implemented by computer program modules.

The present disclosure also provides a computer-readable storage medium, which may be included in the apparatus/device/system described in the above embodiments; or exist alone without being assembled into the apparatus/device/system. The above-mentioned computer-readable storage medium carries one or more programs that when executed, perform the method according to the embodiments of the present disclosure.

According to an embodiment of the present disclosure, the computer-readable medium may be a computer-readable signal medium or a computer-readable storage medium or any combination of the two. The computer-readable storage medium may be, for example, but not limited to, an electrical, magnetic, optical, electromagnetic, infrared, or semiconductor system, apparatus, or device, or any combination of the above. More specific examples of computer-readable storage medium may include, but not limited to: electrical connections with one or more wires, portable computer disks, hard disks, a random access memory (RAM), a read-only memory (ROM), a erasable programmable read-only memory (EPROM or flash), an optical fiber, a portable compact disk read-only memory (CD-ROM), an optical storage device, a magnetic storage device, or any suitable combination of the above. In the present disclosure, a computer-readable storage medium may be any tangible medium that contains or stores a program, and the program may be used by or in combination with an instruction execution system, apparatus, or device. In the present disclosure, a computer-readable signal medium may include a data signal propagated in a baseband or as a part of a carrier wave, and a computer-readable program code is carried therein. This propagated data signal may take many forms, including but not limited to electromagnetic signals, optical signals, or any suitable combination of the foregoing. The computer-readable signal medium may also be any computer-readable medium other than the computer-readable storage medium. The computer-readable medium may send, propagate, or transmit the program for use by or in combination with the instruction execution system, apparatus, or device. The program code contained in the computer-readable medium may be transmitted by any suitable medium, including but not limited to: wireless, wired, optical cable, radio frequency signals, etc., or any suitable combination of the foregoing.

For example, according to an embodiment of the present disclosure, the computer-readable medium may include one or more memories other than the ROM 602 and/or RAM 603 and/or ROM 602 and RAM 603 described above.

The flowcharts and block diagrams in the accompanying drawings illustrate the possible implementation architecture, functions, and operations of the system, method, and computer program product according to various embodiments of the present disclosure. In this regard, each block in the flowchart or block diagram may represent a module, program segment, or part of code, and the above-mentioned module, program segment, or part of code contains one or more executable instructions for realizing specified logical functions. It should also be noted that, in some alternative implementations, the functions marked in the block may also occur in a different order from the order marked in the drawings. For example, two blocks shown in succession may actually be executed substantially in parallel, and they may sometimes be executed in the reverse order, depending on the functions involved. It should also be noted that each block in the block diagram or flowchart, and the combination of blocks in the block diagram or flowchart, may be implemented by a dedicated hardware-based system that performs the specified function or operation, or may be realized by a combination of dedicated hardware and computer instructions.

Those skilled in the art may understand that the features described in the various embodiments of the present disclosure and/or the claims may be combined or/or grouped in various ways, even if such combinations or groups are not explicitly described in the present disclosure. In particular, without departing from the spirit and teachings of the present disclosure, the various embodiments of the present disclosure and/or the features described in the claims may be combined and/or grouped in various ways. All these combinations and/or groups fall within the scope of the present disclosure.

The embodiments of the present disclosure have been described above. However, these examples are for illustrative purposes only, and are not intended to limit the scope of the present disclosure. Although the respective embodiments are described above, this does not mean that the measures in the respective embodiments may not be advantageously used in combination. The scope of the present disclosure is defined by the appended claims and their equivalents. Without departing from the scope of the present disclosure, those skilled in the art may make various substitutions and modifications, and these substitutions and modifications should fall within the scope of the present disclosure.

What is claimed is:

1. A page presentation method performed by a terminal device having a display, comprising:
   receiving an access request for a target page from a user, wherein the target page has a plurality of page blocks; and
   presenting a block snapshot, which is stored locally, of at least one page block in the target page by using the display of the terminal device before network data of the access request is returned from a server in response to the access request that is received, wherein each page block has a respective block snapshot,
   wherein the method further comprises:
   detecting whether an initial snapshot of the at least one page block in the target page is stored locally;
   in response to no initial snapshot of the at least one page block in the target page being stored, generating an initial snapshot of each of the at least one page block and storing the initial snapshot locally as the block snapshot
   in response to the initial snapshot of the at least one page block in the target page being stored, presenting the initial snapshot of the at least one page block in the target page stored locally prior to network data of the access request is returned;
   subsequent to the network data of the access request is returned, generating a real snapshot of the at least one page block in the target page based on the network data, wherein the real snapshot is configured to record a real appearance of each page block of the at least one page block; and
   updating the initial snapshot stored locally based on the real snapshot and the initial snapshot of each of the at least one page block.

2. The method according to claim 1, wherein said updating the initial snapshot stored locally based on the real snapshot and the initial snapshot of each of the at least one page block comprises:
   acquiring first version information and/or first identification information corresponding to the real snapshot of the each of the at least one page block;
   acquiring second version information and/or second identification information corresponding to the initial snapshot of the each of the at least one page block;
   detecting whether the real snapshot of the each of the at least one page block is consistent with the initial snapshot of the each of the at least one page block, based on the first version information and the second version information and/or the first identification information and the second identification information; and
   storing the real snapshot locally at a client to replace the initial snapshot, in response to the real snapshot of the each of the at least one page block being inconsistent with the initial snapshot of the each of the at least one page block.

3. The method according to claim 1, wherein the plurality of page blocks comprises page blocks in a visible area of the display and page blocks in a non-visible area, wherein the real snapshot of the at least one page block are only used to update the initial snapshot of page blocks in the visible area.

4. The method according to claim 1, wherein the block snapshot is a picture of the at least one page block.

5. A terminal device, comprising:
   one or more processors; and
   a memory configured to store one or more programs,
   wherein when one or more programs are executed by one or more processors, the one or more processors are caused to implement the page presentation method according to claim 1.

6. A non-transitory computer-readable medium having executable instructions stored thereon, wherein when the instructions are executed by a processor, the processor implements the page presentation method according to claim 1.

7. A terminal device, comprising:
   one or more processors; and
   a memory configured to store one or more programs,
   wherein when one or more programs are executed by one or more processors, the one or more processors are caused to implement the page presentation method according to claim 2.

8. A non-transitory computer-readable medium having executable instructions stored thereon, wherein when the instructions are executed by a processor, the processor implements the page presentation method according to claim 2.

* * * * *